Jan. 8, 1929.  R. DE M. TAVEAU ET AL  1,698,324
PRODUCTION OF METALLIC CHLORIDE
Filed Jan. 17, 1922   3 Sheets-Sheet 3
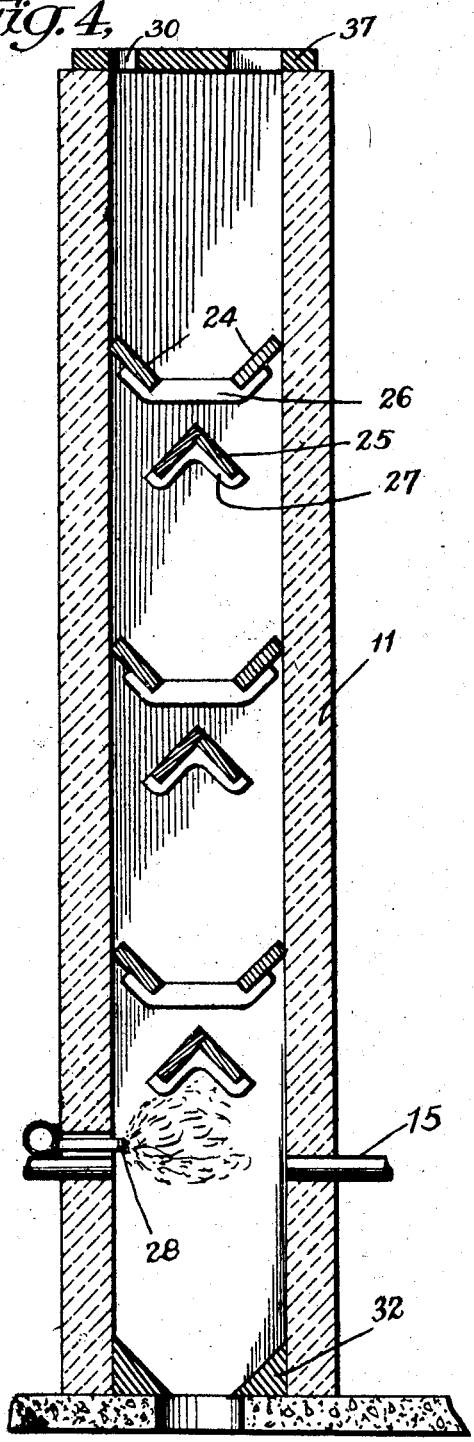
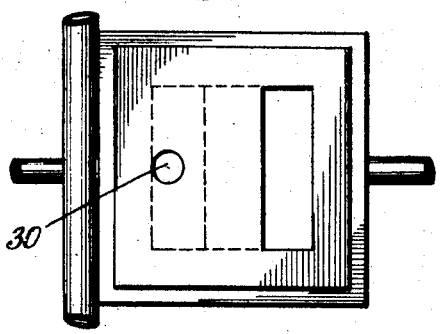
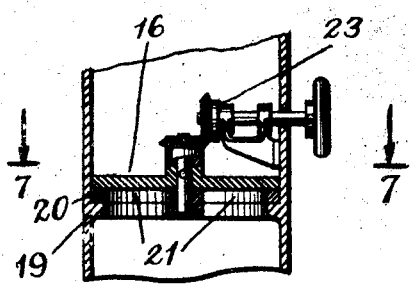
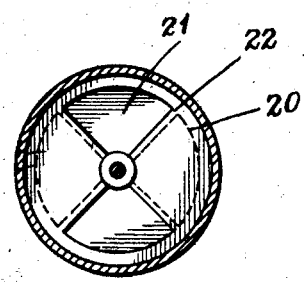

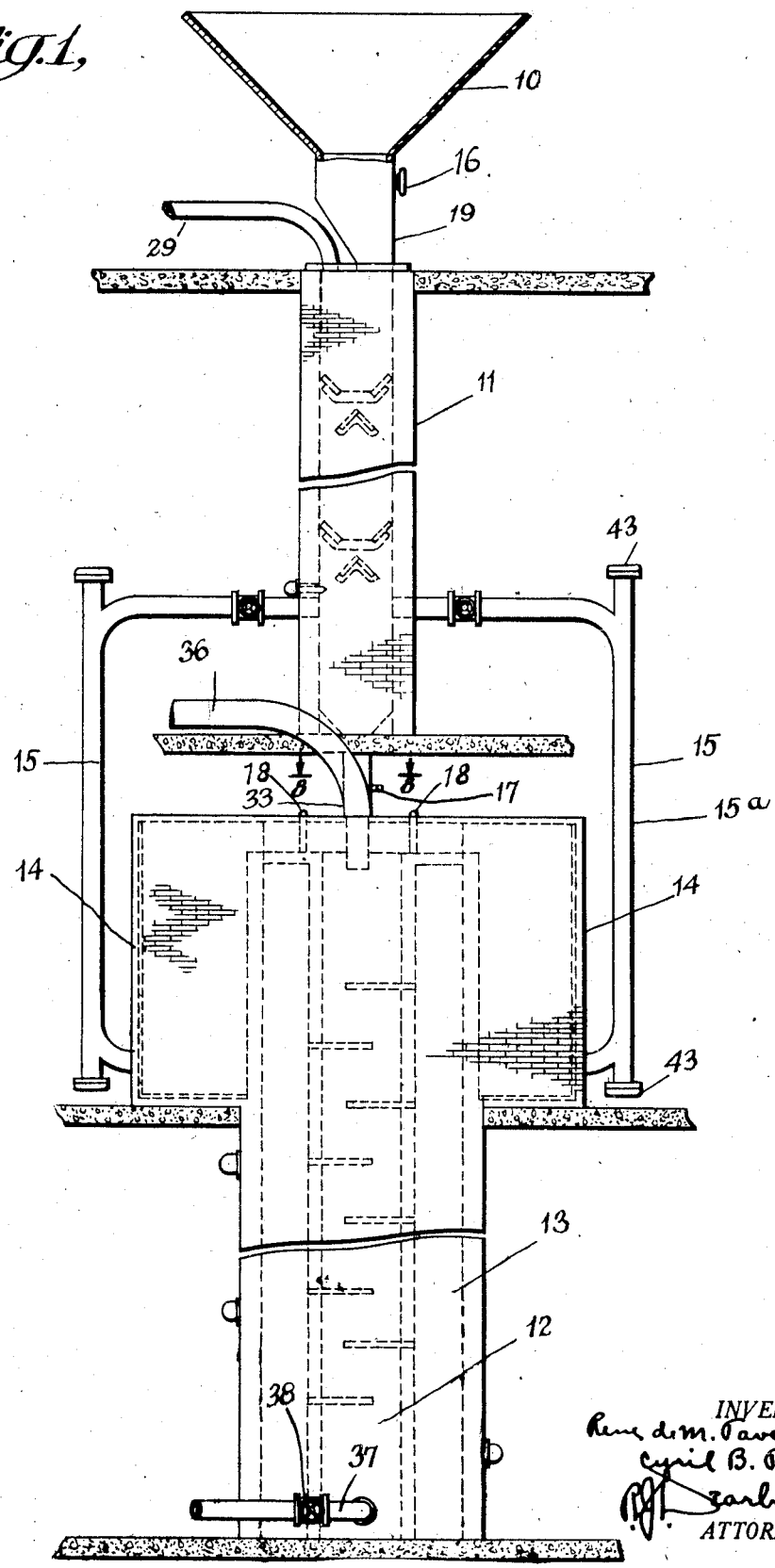

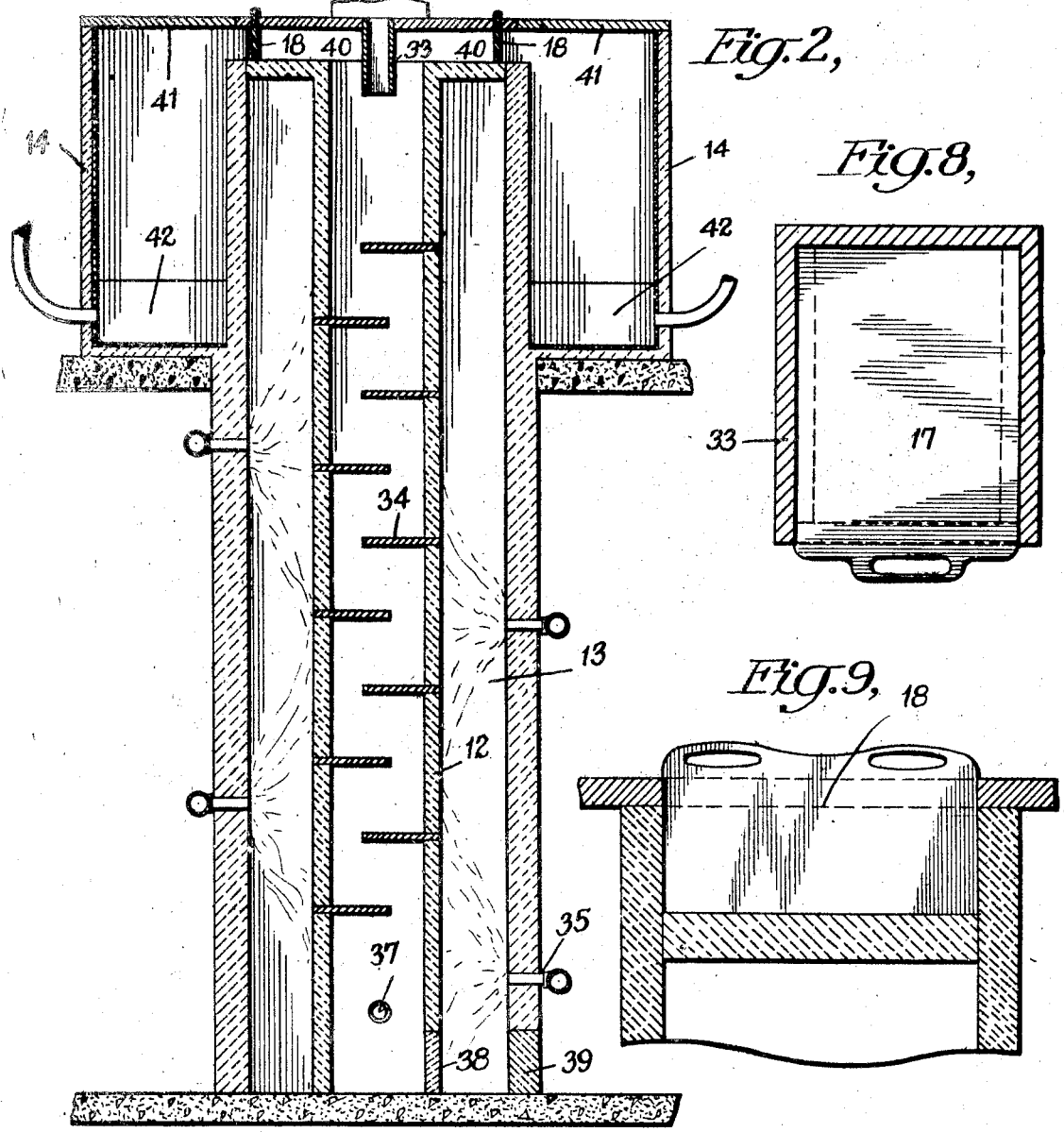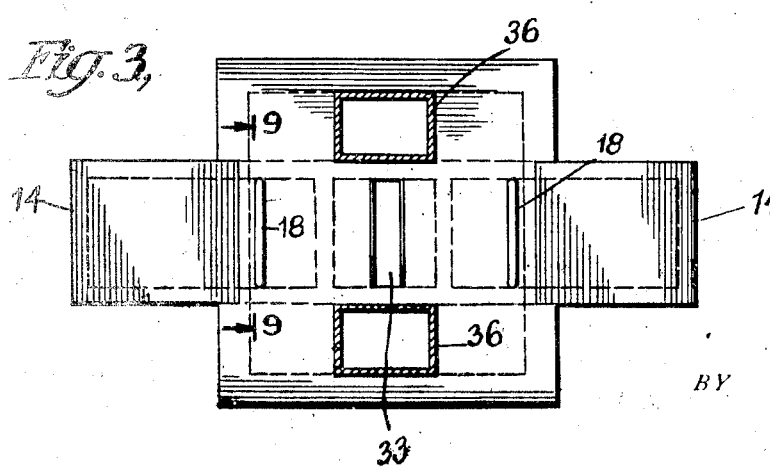

Patented Jan. 8, 1929.

1,698,324

UNITED STATES PATENT OFFICE.

RENÉ DE M. TAVEAU, OF ELIZABETH, AND CYRIL B. TYGERT, OF BAYONNE, NEW JERSEY, ASSIGNORS, BY MESNE ASSIGNMENTS, TO THE TEXAS COMPANY, OF NEW YORK, N. Y., A CORPORATION OF DELAWARE.

PRODUCTION OF METALLIC CHLORIDE.

Application filed January 17, 1922. Serial No. 529,895.

This invention relates to the production of metallic chlorides and has special reference to methods and apparatus for producing anhydrous aluminum chloride by the employment of phosgen gas.

One of the objects of the present invention is to provide a simple, efficient and economical process and apparatus for the production of metallic chlorides by the employment of phosgen gas, which is particularly adapted for a commercial plant by reason of the fact that it is especially effective in chlorinating dehydrated metal-containing materials or ores such as bauxite, for example, under relatively low-temperature conditions, as compared to other processes of manufacture. Low-temperature operating conditions are particularly desirable from a commercial standpoint for the reason that material economies in the construction and maintenance of the apparatus may be effected, inasmuch as it is not subject to rapid deterioration on account of the relatively low temperatures employed.

As phosgen is expensive and is also highly poisonous in character, another object of this invention is to devise a process and apparatus of the above indicated character in which any excess of phosgen shall be utilized and moreover, in the interests of safety, shall be completely destroyed during the process. To the accomplishment of this end, the excess of phosgen liberated from the chlorinating action in the reaction chamber where the production of metallic chlorides takes place, is utilized to complete the preliminary dehydration of the material to be treated, during which action the phosgen is entirely converted into harmless products.

Another object of the invention is to devise a process and apparatus of the nature referred to, which shall possess a high degree of heat economy by reason of the conservation and subsequent utilization of large portions of the heat employed in preliminarily effecting the dehydration of the metal containing material or ore. Accordingly the highly heated dehydrated material, while still at high temperatures, is introduced into the chlorinating or reaction chamber in which it is intimately contacted with the phosgen under suitable heat conditions. In this way the amount of external heat applied to the reaction chamber is greatly reduced inasmuch as the dehydrated metal-containing material or ore is already at high temperatures when it is initially introduced into the reaction chamber.

In accordance with these and other objects of the invention which will hereafter become apparent, the process of the present invention is preferably carried out in a dehydrating chamber and a chlorinating or reaction chamber, that are disposed the one immediately above the other. The metal-containing material or ore, such as bauxite for example, is allowed to gravitate through the upper or dehydrating chamber which is internally heated to a temperature sufficiently high to effect substantially complete dehydration of the material in its passage therethrough. This highly heated dehydrated material is then immediately introduced, while in a heated condition, into the lower or reaction chamber which is maintained at the desired temperature of approximately 700 to 800 degrees F. by the application of suitable external heat. Phosgen in excess is introduced into the lower end of the reaction chamber and as it rises therethrough in counter current relation to the gravitating dehydrated material, it is brought into intimate contact therewith and reacts under the temperature conditions to produce a metallic chloride corresponding to the particular element contained in the ore employed. The evolved metallic chloride in the form of vapor, is conducted to a suitable condenser where it is condensed and collected. The excess of phosgen is removed from the condenser and introduced into the lower end of the upper or dehydrating chamber where it is particularly effective in assisting and completing the dehydration of the material or ore acted upon, during which action, the phosgen is completely destroyed. The waste gases, free of phosgen, may be allowed to escape from the dehydrating chamber into the atmosphere, or they may be collected and by suitable treatment, any hydrochloric acid present may be recovered.

At the outset, it should be understood that although the present invention is intended particularly for the production of anhydrous aluminum chloride, and, for illustrative purposes, is described for the manufacture of this product, the invention is not so limited but is applicable to the manufacture of metallic chlorides generally.

These and other objects and features of the invention will be more readily understood from the following description of the invention with respect to the preferred illustrative embodiment of the apparatus shown in the accompanying drawings, of which—

Fig. 1 is a view in side elevation of the apparatus,

Fig. 2 is a view in vertical section of the reaction chamber and condensing chambers, Fig. 3 is a plan view of the apparatus shown in Fig. 2, Fig. 4 is a vertical section of the dehydrating chamber, Fig. 5 is a plan view thereof, Fig. 6 is a sectional detailed view of a regulatable valve for controlling the feed of bauxite from the supply hopper to the dehydrating chamber, Fig. 7 is a horizontal section along section line 7—7 of Fig. 6, Fig. 8 is a sectional view along section line 8—8 of Fig. 1, showing the regulatable valve for controlling the charge of dehydrated bauxite into the reaction chamber, and Fig. 9 is a view taken along section line 9—9 of Fig. 3, showing the construction of one of the regulatable valves for controlling the flow of aluminum chloride vapors into the condensing chambers.

Referring particularly to Fig. 1, the apparatus shown comprises, in general, a supply hopper 10 for containing the bauxite, or other material to be operated upon; a heated dehydrating chamber 11 through which the bauxite is allowed to gravitate and in which it is substantially dehydrated; a reaction or chlorinating chamber 12 disposed immediately below the dehydrating chamber and through which the highly heated dehydrating bauxite is allowed to fall and mingle with the phosgen gas introduced at the bottom thereof to form aluminum chloride vapors; a furnace 13 enveloping the reaction or chlorinating chamber; a plurality of condensing chambers 14 for receiving and condensing the aluminum chloride vapors evolved in the reaction chamber; a plurality of pipes or conduits 15 connecting the condensing chambers 14 with the lower portion of the dehydrating chamber 11 for the purpose of conducting any excess phosgen into the dehydrating chamber where it assists in the dehydration and is completely destroyed; a controllable valve 16 disposed beneath the supply hopper 10, a controllable valve 17 disposed in the passage between the dehydrating chamber 11 and the reaction chamber 12, and a plurality of controllable valves 18 for controlling the passage of the aluminum chloride vapors into the one or the other of the condensers 14.

The supply hopper 10 which may be of suitable construction, is preferably adapted to contain a large quantity of bauxite, or whatever metal-containing material or ore that is to be treated in the process. The bauxite is delivered into the dehydrating chamber 11 in any desired predetermined quantities through a conduit 19 in which the regulatable valve 16 is located. The valve 16 may be of any suitable construction but preferably comprises a stationary disc 20 (Figs. 6 and 7) having a pair of diametrically opposite openings 21 and a relatively rotatable disc member 22, having corresponding openings 21. By means of a suitable operating mechanism, designated generally by reference character 23, these valve discs may be adjusted so that the openings 21 may be caused to register the one with the other to any desired degree, or may be so positioned so as to entirely close the conduit 19.

Referring particularly to Figs. 4 and 5, the dehydrating chamber 11 is rectangular in form and is constructed of suitable refractory material, having an acid-proof coating or lining on its inner surface. The chamber is provided at spaced intervals with a plurality of baffles 24 and 25, which are constructed and arranged in such manner as to thoroughly agitate and distribute the bauxite as it falls through the chamber. The baffles 24 are spaced apart horizontally and are inclined upwardly and outwardly so as to deliver the bauxite through the opening between them. These baffles are mounted at opposite sides of the chamber on suitable supports 26 projecting laterally into the chamber. The baffles 25 are also disposed at an angle but are arranged in the form of an inverted V, having its apex in the central plane of the chamber. These baffles are carried by suitable supports 27, projecting from opposite walls of the chamber. The construction and arrangement of the baffles 25 is such that the bauxite passing through the opening between the baffles 24 divides into two streams and is deflected outwardly towards the walls of the chamber.

The dehydrating chamber 11 is heated internally to high temperatures sufficient to effect substantially complete dehydration of the ore by means of burners 28 located near the lower end of the chamber and supplied with a suitable fuel, such as gas or the like. The bauxite in falling through the baffled chamber 11 is thoroughly heated and raised to a high temperature, and accumulates in the bottom of the chamber, preferably in red hot condition. During the passage of the bauxite through the chamber, it is substantially completely dehydrated by the action of the heat. The waste gases are permitted to escape into the atmosphere through a suitable flue 29 projecting through an opening 30 into cover 31 of the chamber. The bottom of the chamber is constructed in the form of a hopper 32, having inwardly and downwardly inclined surfaces, as illustrated in Fig. 4, so as to facilitate the introduction of the dehydrated material into the reaction chamber located below. In operation, it is desirable to allow a sufficient quantity of highly heated dehydrated material to accumulate in the bottom hopper of the dehydrating chamber to prevent the rise of vapors and other reaction products from the reaction chamber below.

The reaction or chlorinating chamber 12 is disposed immediately beneath the dehydrating chamber 11, and communicates therewith by means of a passage 33 containing the regulatable valve 17. This valve is preferably in the form of a slide as illustrated in Fig. 8, but any suitable type of valve may be employed. With this arrangement the dehydrated bauxite, while still at high temperature may be introduced into the reaction chamber, thereby conserving the heat imparted thereto to effect its dehydration. The reaction chamber 12 is rectangular in section and is constructed of suitable refractory material and lined with an acid-proof coating or cement. This chamber is also provided with baffles 34 which project alternately from opposite sides thereof to form a tortuous passage for the heated dehydrated material. The baffles in this instance, however, are horizontally disposed in order to allow the accumulation of a sufficient amount of bauxite to insure an excess thereof at all times for the phosgen to react upon. These baffles are preferably removable. The reaction chamber is heated to the desired relatively low temperature, preferably in the neighborhood of 700° to 800° F. by means of a furnace 13 which completely surrounds the chamber and which is provided with a plurality of suitable gas burners 35 located at properly distributed points therein. The outer walls of the furnace 13 are constructed of refractory material, such as fire-brick. The products of combustion of the furnace burners 35 are carried off through a pair of flues 36 communicating with the upper end of the furnace chamber. The construction and arrangement of the reaction chamber and furnace is such that the reaction chamber is heated externally by means of the furnace heat which is conducted thereto through the walls of the furnace reaction chamber which are preferably of quite limited thickness in order that the required heat may be developed within the reaction chamber without the necessity of producing extremely high heats in the furnace.

In order to effect the chlorination of the dehydrated bauxite, or other material, gravitating through the reaction chamber, an excess of phosgen gas is introduced into the lower end thereof through an inlet pipe 37, having a controllable valve 38 therein. Any suitable source of phosgen may be employed, and the manner in which it is made forms no part of these present invention. Upon introducing the phosgen, it rises through the chamber in counter-current relation to the falling dehydrated bauxite and is intimately contacted and co-mingled therewith under the desired temperature conditions, during which action the material is chlorinated and aluminum chloride vapors, or other metallic chloride vapors depending upon the character of the original material, are formed. Any material which escapes chlorination in the reaction chamber accumulates at the bottom thereof and may be removed by taking out removable sections 38 and 39 in the walls of the chamber and the furnace respectively. Material thus removed may be again introduced for further treatment.

The aluminum chloride vapors, together with any excess of phosgen, as well as other products of the reaction, are carried out of the upper end of the reaction chamber and conducted into the one or the other of the condensers 14. In order that these condensers may be operated alternately, so that one may be shut off and cleaned while the other is active, provision is made for controlling the passage of the products of the reaction into said chambers. For this purpose the dampers or valves 18 are provided in the passages 40 communicating with the upper end of the reaction chamber and the respective condensers 14. These dampers 18 are conveniently on the slide type, as illustrated in Fig. 9, although any form of damper may be used. Assuming that one of the dampers 18 is open and the other closed, the products of the reaction, including the resulting aluminum or other metallic chloride vapors and the excess phosgen, are conducted into the open condenser, where the aluminum chloride is condensed and accumulates. Each of these condensers is constructed of refractory material and provided with an acid-proof lining or cement. The covers 41 thereof may be composed of soap stone slabs and are removable in order to permit access thereto for the purpose of scraping or dislodging any condensed aluminum chloride that may have adhered to the walls thereof. The aluminum chloride thus accumulating in the condensers, is conveniently removed therefrom by taking out one of the replaceable sections 42 near the lower ends thereof.

As the chlorinating reaction takes place in an excess of phosgen, certain amounts thereof will pass through into the condensers, and inasmuch as phosgen is not only expensive but also highly poisonous in character, provision is made for utilizing this excess and also effecting its complete destruction with the apparatus.

This is accomplished by introducing the excess phosgen through the one or the other of the pipes or conduits 15 into the lower end of the dehydrating chamber 11. Phosgen is a particularly active dehydrating agent and, therefore, it assists in the dehydration of the incoming bauxite or other material, and insures that substantially complete dehydration is effected. Furthermore, in this action, the phosgen is destroyed and converted into harmless products. The pipes or conduits 15 are likely to become gradually filled with condensed metallic chlorides, and in order that they may be readily cleaned, the pipes are preferably constructed as shown in Fig. 1 and embody detachable plates or covers 43 disposed at the respective ends of the straight sections 15ª thereof. By removing these covers the pipes may be thoroughly cleaned with facility.

The products of combustion rising from the dehydrating chamber 11 are passed through the flue 29 either into the atmosphere or are suitably collected and scrubbed to remove any hydrochloric acid that may be present.

Although the invention has been described as embodying more or less specific details of construction and arrangement of parts, and steps or stages in the process of operation, it will be understood that many modifications and variations thereof may be made without departing from the spirit and scope of the invention. Therefore, only such limitations should be imposed as are indicated in the appended claims.

We claim:

1. A process of producing metallic chlorides from metal-containing materials that comprises passing the metal containing material through a highly heated chamber in which the material is dehydrated, passing the highly heated dehydrated material into a reaction chamber, externally heating said chamber, passing phosgen through the reaction chamber in counter current relation to the dehydrated material whereby a metallic chloride is formed in the vaporous state, condensing the evolved vapors, removing the excess phosgen and introducing it into the lower end of the dehydrating chamber to assist in the dehydration.

2. A process of producing metallic chlorides from metal-containing materials that comprises introducing metal-containing material into the upper end of a dehydrating chamber and permitting it to gravitate therein, internally heating said chamber to a high temperature whereby the material is dehydrated, passing said dehydrated material while still in a highly heated condition into a reaction chamber through which it gravitates, externally heating the reaction chamber to a temperature in the neighborhood of from 700° to 800° F., introducing phosgen into the lower portion of said reaction chamber and passing it therethrough in counter current relation to the dehydrated material whereby a metallic chloride in the vaporous state is formed, taking off and condensing the evolved vapors, and withdrawing the excess phosgen and introducing it into the lower portion of the dehydrating chamber to assist in the dehydration of the material during which action the phosgen is destroyed.

3. A process of producing aluminum chloride from bauxite which comprises introducing the bauxite into the top of an elongated chamber through which it gravitates, internally heating the chamber to high temperatures whereby the falling bauxite is substantially dehydrated, collecting the highly heated dehydrated bauxite in the bottom of said dehydrating chamber, introducing it in heated condition into the top of an elongated reaction chamber, externally heating the reaction chamber to substantially 700° to 800° F., introducing phosgen into the bottom of said reaction chamber and causing it to intimately contact with the dehydrated bauxite as it rises through the chamber in counter current relation thereto whereby a chlorinating action takes place resulting in the formation of aluminum chloride vapors, passing the evolved vapors into a condensing chamber where the aluminum chloride vapors are condensed, removing the excess phosgen from the condensing chamber and introducing it near the bottom of said dehydrating chamber to assist in the dehydration of said bauxite.

4. Apparatus for the production of metallic chlorides having, in combination, elongated vertical dehydrating and reaction chambers disposed the one above the other and having a communicating passage between them, a series of inclined baffles in said dehydrating chamber, a series of horizontal baffles in said reaction chamber, means for internally heating the upper dehydrating chamber, means for externally heating the lower reaction chamber, means for introducing metal-containing material into the top of said dehydrating chamber through which it gravitates and in which it is dehydrated, means disposed in said communicating passage for regulating the supply of hot dehydrated material to the upper end of said reaction chamber through which it gravitates, means for introducing phosgen into the lower portion of said reaction chamber whereby it rises therein in counter current relation to the falling dehydrated material and produces metallic chloride in the vaporous state, and means for condensing and collecting the metallic chloride thus produced.

5. Apparatus for the production of metallic chloride having, in combination, elongated vertical dehydrating and reaction chambers disposed the one above the other and having a communicating passage between them, means for internally heating the upper dehydrating chamber, means for externally heating the lower reaction chamber, means for introducing metal-containing material into the top of said dehydrating chamber through which it gravitates and in which it is dehydrated, means disposed in said communicating passage for regulating the supply of hot dehydrated material to the upper end of said reaction chamber through which it gravitates, means for introducing phosgen into the lower portion of said reaction chamber whereby it rises therein in counter current relation to the falling dehydrated material and produces metallic chloride in the vaporous state, a condenser communicating with the upper end of said reaction chamber for receiving and condensing the metallic chloride vapors, and means for conducting the excess phosgen from said condenser to the lower portion of said dehydrating chamber.

6. Apparatus for the production of metallic chlorides having, in combination, a dehydrating chamber and a reaction chamber disposed the one above the other and having a communicating passage between them, means for externally heating the reaction chamber and internally heating the dehydrating chamber, means for introducing metal-containing material into the top of said dehydrating chamber whereby it is allowed to gravitate through both of said chambers, means for introducing phosgen into the lower end of said reaction chamber, a condenser for receiving and condensing the evolved metallic chloride vapors, and a pipe connecting the condenser with the lower end of said dehydrating chamber for conducting excess phosgen from said condenser into said dehydrating chamber, said pipe being constructed and arranged to permit of thorough cleaning.

7. Apparatus for the production of aluminum chlorides having, in combination, a dehydrating chamber and a reaction chamber disposed the one above the other and having a communicating passage between them, a series of baffles in said reaction and said dehydrating chambers, means for externally heating said reaction chamber and internally heating said dehydrating chamber, a hopper disposed above said dehydrating chamber for containing a supply of bauxite or other aluminum-containing material, regulatable means for delivering the bauxite into the upper end of said dehydrating chamber through which it gravitates, regulatable means within the communicating passage between said chambers for controlling the introduction of hot dehydrated bauxite into the reaction chamber through which it gravitates, means for introducing phosgen into the lower portion of said reaction chamber, and a condenser for receiving and condensing the evolved aluminum chloride vapors.

8. In the manufacture of aluminum chloride by treating aluminum ore with a chloridizing gas, the step that consists in dehydrating aluminum ore, prior to treating same with the chloridizing gas, by passing into said ore a stream of hot gas obtained from treating another quantity of aluminum ore with chloridizing gas.

9. The process of manufacturing aluminum chloride that comprises preliminarily treating aluminum ore to dehydrate same, subjecting the dehydrated ore to the action of phosgene under the influence of heat, separating out aluminum chloride from the evolved gases and passing the remaining gas containing phosgene into contact with the ore being dehydrated.

In witness whereof we have hereunto set our hands this 11th day of January 1922.

RENÉ DE M. TAVEAU.
CYRIL B. TYGERT.